Figure 1:
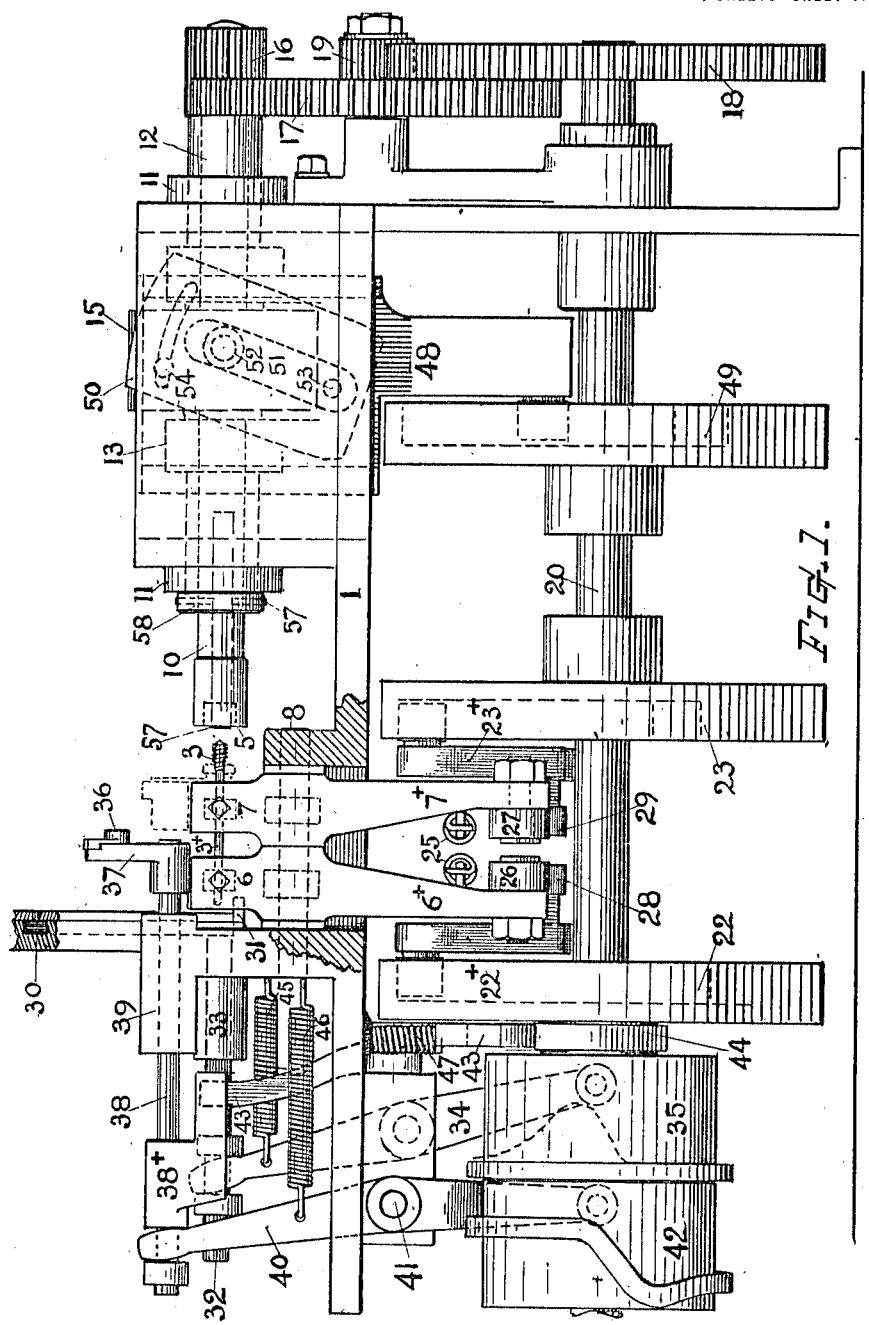

C. G. TIDEMAN.
AUTOMATIC NUT TAPPING MACHINE.
APPLICATION FILED AUG. 26, 1915.

1,274,355.

Patented July 30, 1918.
4 SHEETS—SHEET 1.

Inventor.
Carl G. Tideman
By Chas. H. Burleigh
Attorney

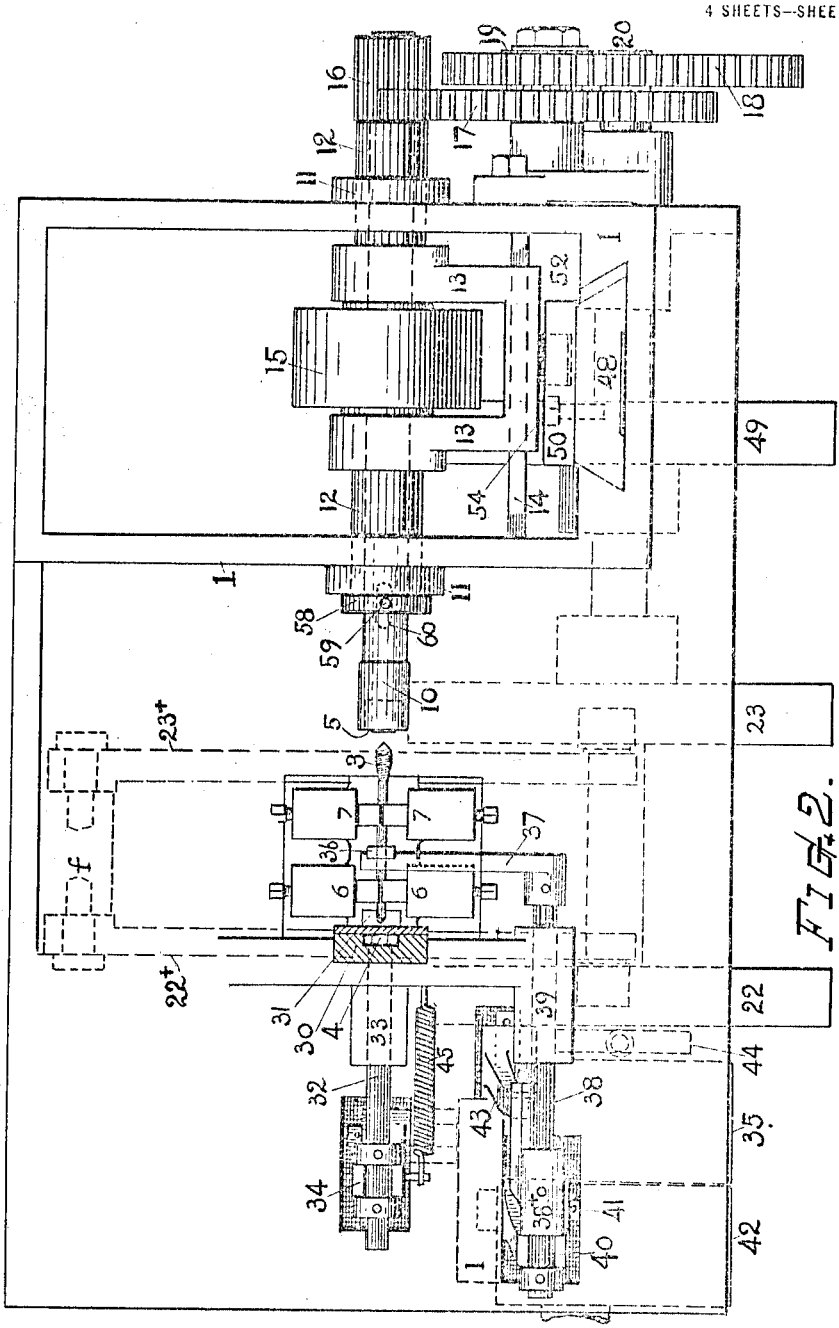

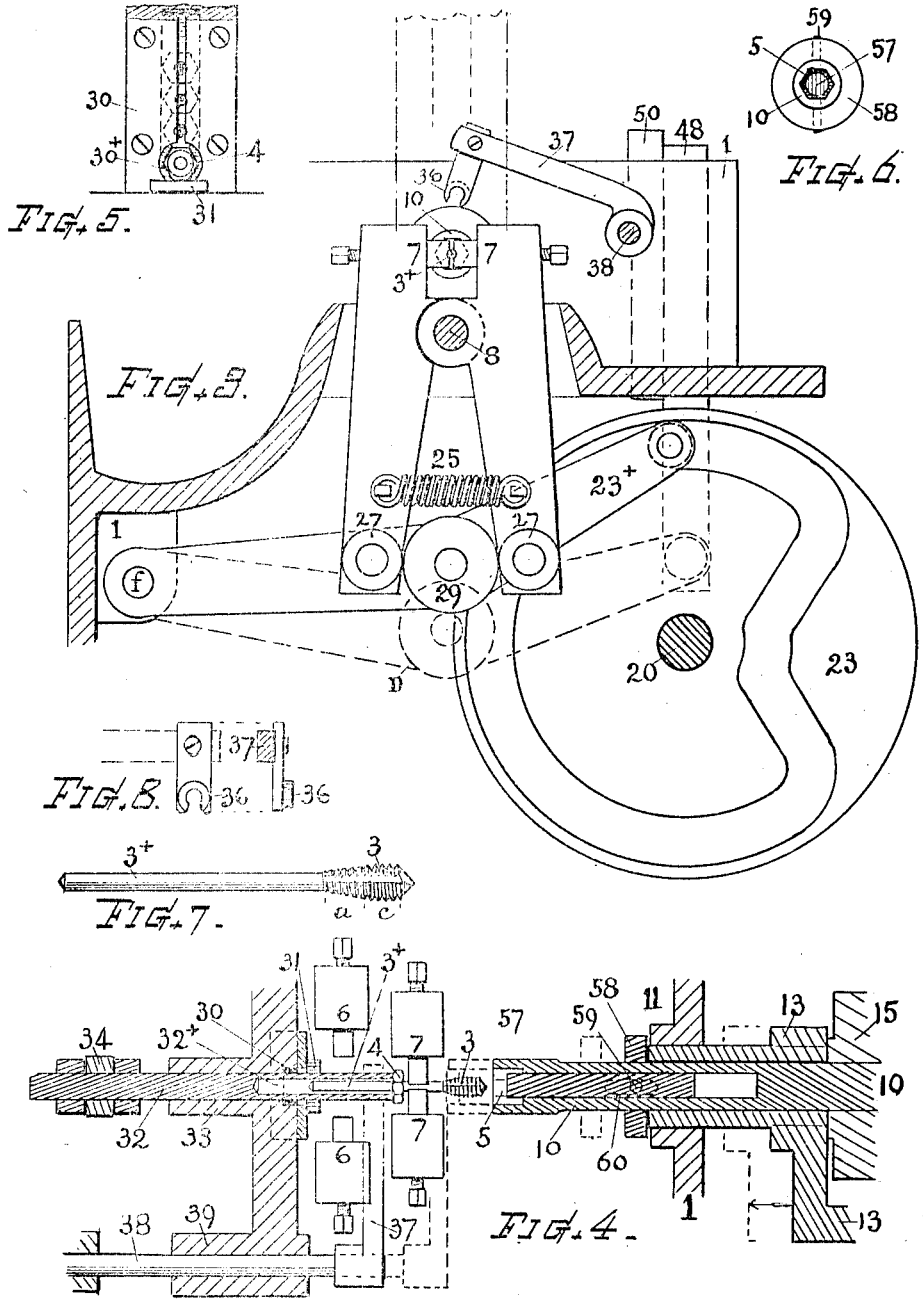

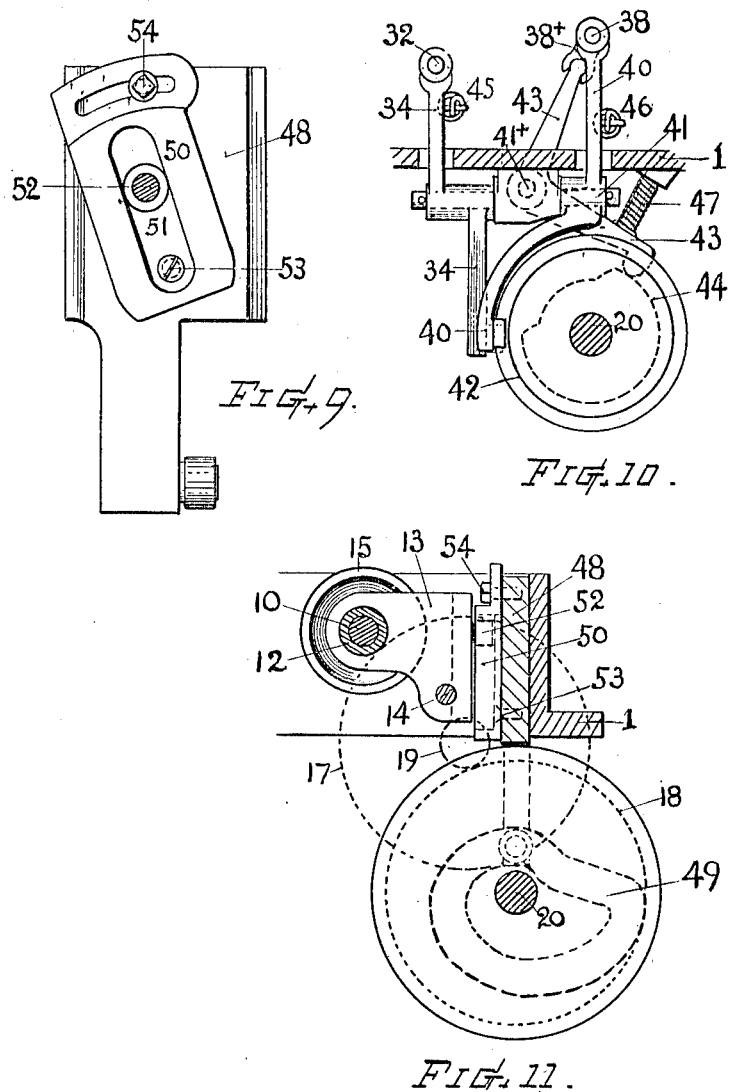

UNITED STATES PATENT OFFICE.

CARL G. TIDEMAN, OF WORCESTER, MASSACHUSETTS; ROSE M. TIDEMAN, EXECUTRIX OF SAID CARL G. TIDEMAN, DECEASED, ASSIGNOR TO CHARLES T. BURLIN, OF NORTHBRIDGE CENTER, MASSACHUSETTS.

AUTOMATIC NUT-TAPPING MACHINE.

1,274,355.  Specification of Letters Patent.  Patented July 30, 1918.

Application filed August 26, 1915. Serial No. 47,459.

*To all whom it may concern:*

Be it known that I, CARL G. TIDEMAN, a citizen of the United States, residing at Worcester, in the county of Worcester and State of Massachusetts, have invented certain new and useful Improvements in Automatic Nut-Tapping Machines, of which the following is a specification.

In the embodiment of my invention I provide a stationary tap or thread-cutting tool, over which the nuts are passed to be threaded; a plurality of pairs of tap-holding devices or jaws adapted for gripping the shank of the tap, and for alternately opening to permit the nuts to pass by the jaws; means for opening and closing the jaws at the proper time of action; means for automatically feeding the unthreaded nuts to the thread-forming mechanism; means for holding and rotating the nut while it is being tapped; a longitudinally movable operating shaft and devices for effecting endwise movement of the nut-rotating means, and a discharging device for ejecting the tapped nut from the holder or chuck cavity. The several parts and devices are constructed and combined in an organized mechanism for carrying out the mode of operation set forth, or substantially as more fully hereinafter explained, and illustrated in the four sheets of drawings; wherein Figure 1 represents a side elevation view of a nut tapping mechanism embodying the features of my invention. Fig. 2 is a top plan view of the same. Fig. 3 is a transverse sectional view illustrating the tap-holding jaws and means for operating the same. Fig. 4 represents a longitudinal section of the rotating spindle and nut feeding devices and their relation to the tapping tool when in action. Fig. 5 represents the lower end of the feed chute and its exit opening. Fig. 6 is an end view of the chuck spindle. Fig. 7 represents the tap drawn to somewhat larger scale. Fig. 8 shows the front and side views of the pusher face. Fig. 9 is a separate view of the slide block and adjustable cam-plate by which endwise movement is imparted to the yoke and spindle. Fig. 10 represents a sectional end view of the cam-shaft and levers for actuating the nut-feeding devices, drawn on somewhat reduced scale; and Fig. 11 represents (on similar scale) a transverse sectional view of the spindle and means for reciprocating the same.

Referring to the drawings, the part marked 1 represents the main frame which may be of any suitable form for supporting the operating parts of the machine. The numeral 10 indicates a rotatable drive-shaft or spindle arranged within and extending through non-rotatable bearing sleeves or members 12 that are mounted to slide endwise in bearings 11 upon the frame. The inner ends of the sleeve members are rigidly united to the respective arms of a laterally offset head or furcated yoke 13 that slides upon a guide 14 parallel with the spindle 10. A pulley 15 for the driving belt, is fixed to the spindle between the arms of the yoke 13; the ends of the pulley abutting against the inner faces of the yoke keeps the spindle in endwise relation with the sliding sleeve 12, but leaves it free to revolve therein by action of the belt upon the pulley 15.

One end of the spindle 10 is fitted for a chuck, or nut-holding means 5, while its outer end is furnished with a gear-pinion 16, from which power and motion are transmitted through a set of gears 17 and 18, and pinion 19 to a rotatable shaft 20 having thereon a series of cams of suitable shape, respectively, for actuating various parts of the mechanism, as hereinafter specified. The part of the spindle which forms the nut-holding chuck may be integral with or separate from the main portion of the spindle as preferred.

Numeral 3 indicates the threading tap which is formed as best shown in Figs. 2, 4 and 7; one figure showing the tap separate and the other figures showing it in position for service. Said tap comprises a short thread-cutting head 3 of the required dimension or gage, and a comparatively short straight shank 3+ of less diameter than the interior of the non-threaded nuts. The tapping head 3 is slightly conoidal at its inner end $a$, and cylindrical near the outer end, as at $c$, (see Fig. 7) and is made to pass entirely through the eye of the nut when cutting the thread therein.

The tap is arranged in axial alinement with spindle 10 at a position where the end cavity or chuck 5 will pass over its head by the endwise movement of the spindle 10. The tap is held firm and stationary by a plurality of pairs of oppositely-closing clamping jaws or members 6 and 7, that grip the shank of the tap at different positions of its length, as best indicated in Figs. 2, 3 and 4. The jaw bars 6+ and 7+ are, in the present instance, and preferably, all hinged upon a common pivot 8 supported in the frame, so as to open and close with a swinging action, or opposite right and left movements.

The jaws are best furnished or constructed with removable hardened steel detents or jaw-plates that are adjustably fitted in the swinging jaw-bars, and retained and regulated therein by suitable set-screws or other approved fastening means. The lower ends of the jaw-bars are provided with stud-rolls or contact members 26 and 27. The opposite jaw-bars of each pair are connected to each other by a pull spring 25 having sufficient tension to open the jaws when relieved of the closing force. The pairs of jaws are severally actuated by cams 22 and 23 fixed upon the shaft 20, and through the aid of jack levers 22+ and 23+, that are fulcrumed to the frame at $f$ and each provided at the opposite end with a stud-roll that engages its respective cam; also having at an intermediate position thereon a member or stud-roll (28—29) that wedges between the rolls upon the lower ends of the jaw-bars, as indicated in Fig. 3; so that the jaws close when the lever is lifted, and open when the lever is depressed. The cams 22 and 23 are shaped to control the action of the jaws at the proper time and intervals. On Fig. 3, dotted lines D show the lever as depressed.

The jaw-actuating means is arranged to permit the opening of the pairs of jaws alternately to release their grip, one pair at a time, upon the shank of the tap, so that a nut 4 can be moved along the shank past one pair of jaws, while the tap is securely held by the other pair of jaws; the first pair then closing and the second pair opening, thus permitting the passage of the nut along the shank and over the head of the tap.

For delivering the untapped nuts, I provide an automatic feed mechanism comprising a delivering chute 30, the lower end of which is positioned adjacent to the end of the tap shank, and provided with an exit opening 30+ in axial alinement therewith of sufficient size to permit a nut to pass from the chute 30 onto the shank 3+. A small shelf 31 projects from the foot of the chute and a little way beneath the end of the shank, for the purpose of bridging the space. At the back of the exit opening, and in axial alinement with the tap, there is an endwise reciprocating rod or plunger 32, supported in a suitable guiding bearing 33, and having a tubular end 32+ that can pass over the end of the shank and is adapted for ejecting a nut from the chute onto the shank of the tap when said rod is projected forward. Reciprocation of the rod 32 is, in the present instance, effected by a lever 34 actuated and controlled by a suitably shaped cam 35 fixed on the shaft 20; the action being timed to successively feed nuts from the chute as fast as they may be tapped.

It will be understood that in practice a suitable hopper or container for the supply of nuts, is combined with the upper end of the chute, together with devices for selecting and directing the nuts thereinto in orderly manner. Such container and devices may be of any well known or suitable construction, but since the particular construction thereof is not an essential part of my claimed invention, such parts are not herein shown.

A pusher means is provided for sliding the nuts 4 along the shank 3+ to the tapping head 3. Said pusher, as herein illustrated, consists of an arm or finger 37 fixed upon an endwise movable rockable shaft 38 mounted in a suitable bearing 39, parallel with the tap, and carrying a furcated end member or face projection 36 for engaging the nut. Fixed upon the shaft 38 is a hub 38+ furnished with flange or lugs for engaging with actuating means for rocking the shaft. Said pusher means, in the present instance, consists of a swinging lever 40 fulcrumed at 41, and a cam 42 fixed on the shaft 20. Numeral 43 indicates a lever for rocking the shaft 38 sidewise; it is actuated and controlled by a suitably shaped cam 44 upon the cam-shaft 20, and a push spring 47.

The nut-feeding devices and the pusher means are each provided with a spring, 45 and 46, that affords a yielding action to their forward movement, so that in case a nut becomes jammed in the mechanism there will be no breakage of parts.

Numeral 48 indicates a vertically reciprocating dove-tailed slide operated by a cam 49 fixed upon the shaft 20. Upon the face of said slide, adjacent to the yoke 13, there is an attached cam-plate 50 provided with an inclined slot 51 that engages with a stud-roll 52 mounted upon and projecting from the back of the yoke 13. The slot, being inclined, vertical movement of the slide 48 effects an endwise movement of the yoke 13, sleeve 12 and spindle 10, more or less, according to the degree of inclination at which the slot is placed.

The slotted cam-plate 50 is best connected with the slide by a pivot-bolt 53 and a clamp-bolt 54 (see Fig. 9) so that the relative inclination can be regulated as desired, to vary the effected movement to correspond with the pitch of the thread cut by any particular tap to be used.

The end of the spindle 10, which is in axial alinement with the tap 3, is furnished with a cavity or chuck 5 approximately corresponding to the shape and size of the nut 4 into which the nut enters as the spindle is moved forward, so that the nut is caused to revolve about the stationary tap with the rotary action of the spindle, thus causing the tap to thread the interior of the nut. An endwise movable pin 57 is arranged within the hollow interior of the spindle 10, and connected with an exterior collar 58 by a pin 59 that passes through a longitudinal slot 60 in the spindle, which permits a limited movement of the pin 57. When the spindle is retracted the collar 58 contacts with the bearing and projects the pin 57 so that its end is about flush with the end of the spindle. When the spindle is moved forward the pin can slide back within the hollow of the spindle, leaving the end cavity 56 unobstructed for receiving the nut and tap.

In the operation: The chute 30, being supplied with nuts, and the first pair of tap-holding jaws 6 being opened, the rod 32 is actuated to push a nut from the chute 30 onto the shank 3⁺ of the tap, which enters the eye of the nut and the tubular end of the rod 32, while the latter slides the nut 4 to a position adjacent to the second pair of jaws 7, leaving it there while the rod 32 retreats to its primal position, permitting another nut to come into position at the foot of the chute. The rocking pusher 37 is then actuated, bringing its furcated head 36 down astride the shank 3⁺ and behind the nut thereon. In the meantime the jaws 6 are closed and the jaws 7 are opened. The pusher 37, actuated by the spring 46, cam 42 and lever 40, then moves forward, sliding the nut 4 onto the tapered leading end $a$ of the tapping head 3, while at the same time the revolving spindle 10 is moved endwise by action of the cam 49, slide 48, slotted cam-plate 50 and yoke 13, bringing the cavity or chucking matrix 5, at the end of the spindle, over the head of the tap, so that the nut upon the tap is pushed into the chucking matrix or cavity 5 by the pusher-face 36, and as the cavity approximately fits the shape of the nut, it acts as a socket wrench, causing the nut to revolve about the stationary tap with the motion of the spindle 10, thereby cutting a screw-thread within the nut and simultaneously screwing the nut off the outer end of the tap; the spindle 10 moving backward as the threading progresses toward its end. When the nut 4 is free from the tap 3, the collar 58 contracts with the bearing 11, then further backward movement of the spindle causes the end of the pin 57 to eject the finished nut from the cavity, so that the nut drops down out of the way, thus making ready for a repetition of the operation. The operation is entirely automatic and can be carried on at comparatively high speed.

I am aware that in practising my invention some changes in the form of its embodiment may be made by those skilled in the art, without departure from the nature and scope of the invention as expressed in the claims. Therefore I do not wish to be limited to the special forms and details in construction as shown;

But what I claim and desire to secure by Letters Patent, is—

1. In a mechanism of the class described, the combination, of a horizontally arranged stationary supported tap, means for supporting the same, a reciprocatory movable rotatable hollow nut-holding device having a nut-receiving matrix and in axial alinement with said tap, a nut-delivery chute having an exit opening in alinement with the tap, reciprocating means movable through said exit opening for projecting nuts singly from said chute onto the tap, alternatively operative gripping devices coöperating with said tap to permit nuts to be moved lengthwise of the tap, means for passing the nut to a position for engagement with the rotating matrix, and means within the hollow nut-holding device for releasing the nut from the matrix after the tap leaves the threaded eye of the nut.

2. In a nut-tapping machine, in combination, a non-rotating horizontally arranged tap, a horizontally arranged hollow nut-holding device normally separated from said tap in axial alinement therewith, means for moving said nut-holding device toward and from said tap to engage the nut blank and turn it on the tap and to withdraw the nut from the tap, means for rotating said nut-holding device, means for reciprocating the same, and means within the nut-holding device to eject the nut therefrom when the latter is moved away from the tap.

3. In a nut-tapping machine, in combination, a horizontally arranged stationary tap, a stationary chute having an exit opening in alinement with said tap, a reciprocating device movable through said exit opening for moving the nut blank onto said tap, means for alternately gripping and releasing said tap, a hollow spindle in axial alinement with said tap and normally separated therefrom, means for moving said hollow spindle toward and from said tap, and an ejector for the nut within said hollow spindle.

4. In a nut-tapping machine, in combination, a tap, a rotatable spindle axially movable toward and from said tap, and means for varying the distance the spindle is moved axially per revolution to enable the nuts to be tapped in the machine with taps having tap-threads of different pitch.

5. In a nut-tapping machine, in combination, a horizontally arranged stationary supported tap, a tap-supporting means comprising a plurality of pairs of vertically arranged swinging jaw-bars carrying jaw-members that grip the shank of the tap, a jack-lever for each pair of jaw-bars provided with means for forcing apart the opposite ends of said jaw-bars and releasing the same, a rotatable cam-shaft arranged substantially parallel with the said tap, cams fixed thereon and engaging with said jack-levers for controlling the respective tap-supporting jaws.

6. In a nut-tapping machine, in combination with a tapping tool comprising a straight shank and a thread-cutting head, its taper leading therefrom, a plurality of oppositely acting retractable gripping members that hold the shank of the tap, a nut-delivery chute having an exit opening in alinement with the said tapping tool, and adapted for positioning a nut at the end of the tap, a longitudinally movable feeder having a tubular end in axial alinement with the tap and adapted for transferring the positioned nut from said chute onto the shank of tap, and means for actuating said feeder to reciprocate the same in axial alinement with said tapping tool.

7. In a nut-tapping mechanism, the combination of a longitudinally movable and rotatable nut-holding spindle horizontally arranged and having a nut-receiving interior at the end thereof, means for automatically feeding or delivering nuts singly to engage said interior; means for rotating and longitudinally moving said spindle, a non-rotatable tap having a thread-cutting head over which the nut passes and toward and from which said spindle is moved, a plurality of retractable tap-holding devices, means for alternately retracting said devices to permit passage of the nuts, and means for sliding the successively delivered nuts along the tap.

8. In a machine of the class described, the combinaion, of a horizontally arranged spindle having a chuck or nut-holding matrix at the end thereof, a horizontally arranged thread-cutting tap in axial alinement therewith and normally separated therefrom, retractable members for clamping and supporting the tap, means for automatically operating said members, a nut delivery chute having an exit opening adjacent to and in alinement with the tap, a reciprocating feeder element adapted for projecting a nut from said chute onto the shank of the tap, means for actuating said feeder member, a laterally movable pusher finger for sliding the horizontally arranged nut along the tap, a reciprocating carrier for said finger, and means for operating said carrier.

9. In a nut-tapping machine, the combination with the tap, an endwise movable spindle having means for rotating a nut about said tap, of means for varying the endwise movement of said spindle to accommodate the pitch of different screw threads, consisting of a reciprocating slide and cam-plate having an inclined slot or guide for the engaging means that moves said spindle, and an adjusting means for regulating the relative inclination of said cam-plate.

10. In a mechanism of the character described, the combination, of a tapping tool, means for supporting said tapping tool, a rotatable spindle provided with a nut-holding chuck or cavity in axial alinement with the tapping tool, a drive pulley fixed on said spindle, a slidable engaging yoke having sleeve-bearings for supporting the spindle, said sleeve-bearings being endwise movable in bearings upon the frame, a slide-block movable in guides in cross-way relation to the spindle axis, a cam-plate carried upon said slide-block and operatively connected with said yoke by an inclined slot and a stud-roller engaging therein, and means for reciprocating said slide-block.

11. In a mechanism of the class described the combination, of a stationary tapping tool, means for supporting the same, a rotatable drive spindle provided with a chuck cavity or nut-holding means in axial alinement with said tapping tool, a drive pulley fixed upon the spindle, an engaging yoke having bearings in which the spindle is mounted, and being endwise movable in bearings upon the frame, a slide-block movable in crosswise relation to the spindle, a cam-plate carried upon said slide and having an inclined slot, means upon said yoke engaging with said slot, a cam-shaft, a cam fixed thereon adapted for actuating the slide-block, a pinion fixed upon the spindle, a gear fixed upon said cam-shaft and intermedial change gearing for transmitting motion from the drive-spindle to said cam-shaft.

12. In a machine of the class described, in combination with a non-rotating tap, retractable tap-holding members, and means for delivering unthreaded nuts onto said tap, and means for sliding the same to the thread-cutting head; of a rotating endwise reciprocating spindle having a tubular part with an end cavity or chuck for receiving and rotating the nut upon the threading tap, an endwise slidable ejector within said tubular part, an exterior contact collar joined to said ejector by a transversely arranged pin passed through a slot in the spindle, means for rotating the spindle, and means for imparting endwise movement thereto.

CARL G. TIDEMAN.

Copies of this patent may be obtained for five cents each, by addressing the "Commissioner of Patents, Washington, D. C."